US006999769B1

(12) United States Patent
Henon

(10) Patent No.: US 6,999,769 B1
(45) Date of Patent: Feb. 14, 2006

(54) METHOD FOR IN-PROGRESS TELEPHONE CALL TRANSFER BETWEEN A WIRELESS TELEPHONE AND A WIRED TELEPHONE USING A SHORT-RANGE COMMUNICATION CONTROL LINK

(75) Inventor: Alexandre Henon, Newark, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/456,900

(22) Filed: Dec. 8, 1999

(51) Int. Cl.
*H04Q 7/20* (2006.01)

(52) U.S. Cl. .................. 455/445; 455/437; 379/211.02

(58) Field of Classification Search ................ 455/445, 455/417, 426, 432, 435, 461, 462, 463, 518, 455/519, 436, 437, 439, 442, 414.1, 416, 455/432.1, 41.2, 41.3, 560
See application file for complete search history.

(56) References Cited

U.S. PATENT DOCUMENTS

| 5,390,233 | A | | 2/1995 | Jensen ......................... 379/58 |
|---|---|---|---|---|
| 5,673,308 | A | * | 9/1997 | Akhavan ................... 455/33.1 |
| 5,825,864 | A | * | 10/1998 | McGraw et al. ............ 455/405 |
| 5,826,196 | A | * | 10/1998 | Cuthrell ....................... 455/462 |
| 5,862,475 | A | * | 1/1999 | Zicker et al. ................ 455/419 |
| 5,873,037 | A | * | 2/1999 | Zicker et al. ................ 455/450 |
| 5,878,344 | A | * | 3/1999 | Zicker ...................... 455/426.1 |
| 5,913,163 | A | * | 6/1999 | Johansson ................... 455/426 |
| 6,195,531 | B1 | * | 2/2001 | Aguirre et al. ............. 455/426 |
| 6,330,244 | B1 | * | 12/2001 | Swartz et al. ............... 455/434 |
| 6,421,536 | B1 | * | 7/2002 | Uranaka et al. ............ 455/417 |
| 6,493,550 | B1 | * | 12/2002 | Raith ...................... 455/422.1 |

OTHER PUBLICATIONS

Website: www.bluetooth.com—5 pages overview of Bluetooth Attached.

* cited by examiner

*Primary Examiner*—Edward F. Urban
*Assistant Examiner*—Thuan Nguyen
(74) *Attorney, Agent, or Firm*—Michael J. Ure

(57) ABSTRACT

In-progress call transfer between a wireless telephone and a wired telephone is effected using a short-range wireless communication link between the devices. Each of the devices are provisioned to include a short-range radio or infrared transceiver so that the devices can communicate with each other over the short-range wireless communication link, preferably using a given short-range wireless protocol. When the wireless telephone's battery is almost exhausted, or for any other reason that the user may desire, the wireless telephone requests the wired telephone's phone number by communicating with wired telephone over the short-range wireless communication link. Upon receipt of the wired telephone's phone number the wireless telephone issues a call transfer request to a cellular base station, passing the wired telephone's phone number. The base station and the network then re-route the call to the wired telephone.

19 Claims, 5 Drawing Sheets

METHOD FOR IN-PROGRESS TELEPHONE CALL TRANSFER BETWEEN A WIRELESS TELEPHONE AND A WIRED TELEPHONE USING A SHORT-RANGE COMMUNICATION CONTROL LINK

BACKGROUND OF THE INVENTION

1. Technical Field

The present invention relates generally to telecommunications and, in particular, to a method for transferring an in-progress telephone call between wireless and wired telephones operating in proximity to each other.

2. Description of the Related Art

Low-priced, state-of-the art cellular telephones are now widely available in the consumer marketplace. Indeed, many individuals now use cellular communications for much of their business as well as personal use. Nevertheless, those who use cellular telephones often find themselves cut off or dropped in the middle of a wireless call for any number of reasons, such as battery loss, network connection problems, or the like. Even when the connection between the cellular telephone and the wireless network remains intact, the link quality may be very poor, for example, as the user moves between cells. For these and other reasons, there has developed a need in the art to provide technology for transferring an in-progress telephone call between wireless and wired telephones.

An attempt to address this need in the art is described in the U.S. Pat. No. 5,390,233 to Jensen et al. This patent describes a wireless network controller that supports telephone call transfers between a wireless telephone and wired telephone. In this patent, first and second wired communication channels are connected to a telecommunications switch and the wired telephone, respectively. A third wired communication channel is coupled to an RF base station that supports a plurality of concurrent wireless communication channels. An interface circuit coupled to the first, second and third channels switches the connection of the first channel associated with the telecommunications switch between the second and third channels, and thus between the wired and wireless telephones.

Although the technique described in the Jensen et al. patent provides for in-progress call transfer between wireless and wired telephone devices, it requires a complex control circuit and dedicated communication channels. This technique further requires that the wired telephone be in physical range of the cellular base station.

There remains a need in the art to develop improved and more efficient techniques for in-progress call transfer between wireless and wired telephone devices. This invention addresses this need.

BRIEF SUMMARY OF THE INVENTION

In-progress call transfer between a wireless telephone and a wired telephone is effected using a short-range wireless communication link between the devices. Each of the devices are provisioned to include a short-range radio or infrared transceiver so that the devices can communicate with each other over the short-range wireless communication link, preferably using a given short-range wireless protocol. A preferred short-range wireless protocol is Bluetooth, although any convenient protocol may be used for this purpose. When the wireless telephone's battery is almost exhausted, or for any other reason that the user may desire, the wireless telephone requests the wired telephone's phone number by communicating with the wired telephone over the short-range wireless communication link. Upon receipt of the wired telephone's phone number, the wireless telephone issues a call transfer request to a cellular base station, passing the wired telephone's phone number. The base station and the network then re-route the call to the wired telephone. When the user (or another) places the wired telephone off-hook, the in-progress telephone call is connected to both the wireless telephone and the wired telephone. The user may then disconnect the call from the wireless telephone, for example, by going on-hook. The telephone call transfer is then complete.

By using the short-range wireless communication link to exchange the telephone number data, the present invention avoids the use of complex interface circuitry, and it much simpler and easier to implement and use as compared to the prior art. As long as the wireless and wired telephones are provisioned with the short-range wireless transceiver and can communicate using the given protocol, in-progress call transfer between the devices is reliable and secure.

The foregoing has outlined some of the more pertinent objects and features of the present invention. These objects and features should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed DESCRIPTION.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
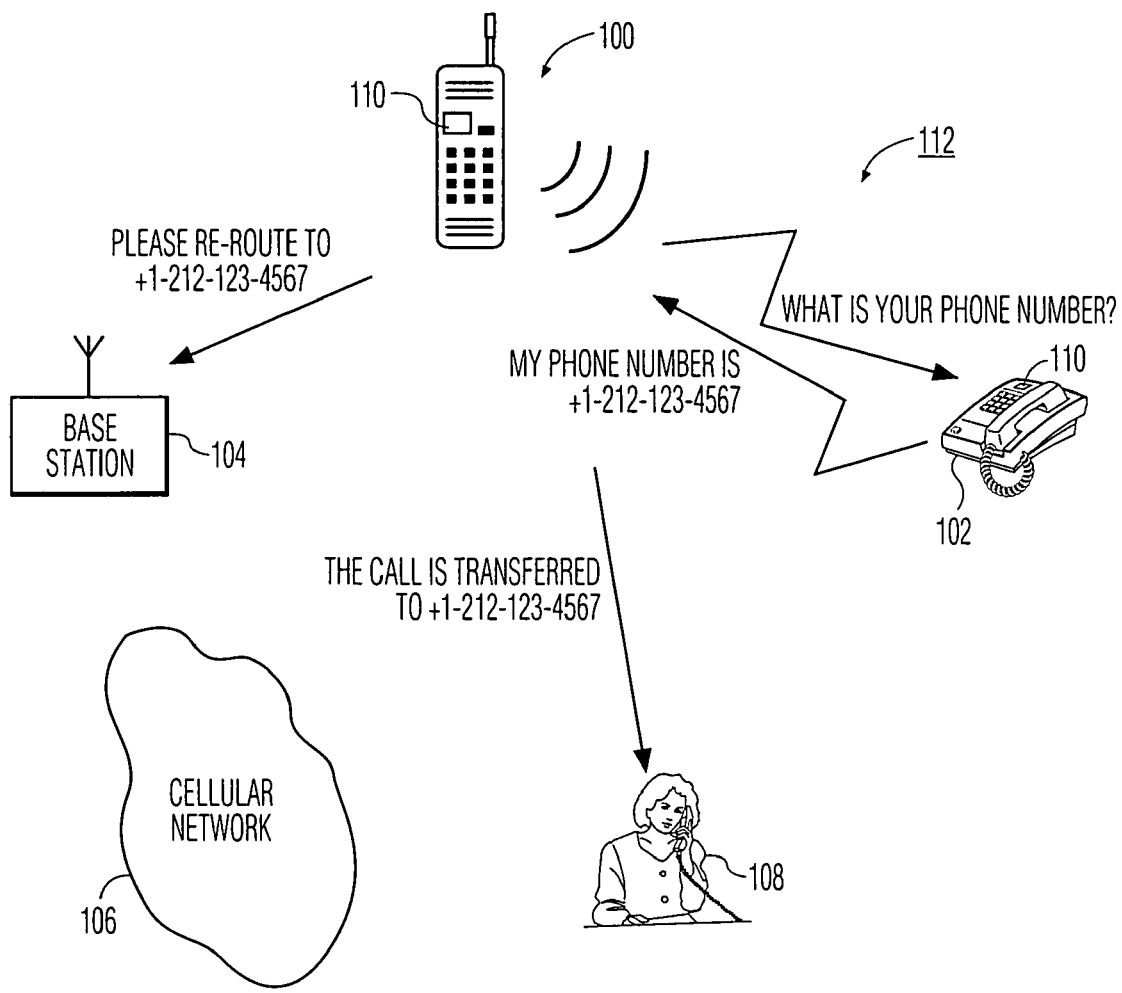
FIG. 1 is a high level illustration of the inventive in-progress call transfer technique.

FIG. 1 is a simplified illustration of how an in-progress telephone call is transferred between a wireless telephone device 100 and a wired or "wireline" telephone device 102 according to the present invention. The wireless telephone device is sometimes referred to herein as a mobile radio handset or a cellular telephone. As illustrated in this drawing, the wireless telephone is connected to a base station 104, which is part of a cellular telephone network 106. The wired telephone device 102 is connected to a wireline telephone network 108 in the usual manner. Further details concerning this known telephone system architecture are provided below.

Each telephone device includes a similar short-range wireless transceiver 110 to enable the devices to communicate with each other over a short-range wireless communication link 112. Preferably, the devices communicate using a given short-range radio link that conforms to a given protocol. In a particularly preferred embodiment, each transceiver 110 implements the Bluetooth protocol as described by the Bluetooth Specification Version 1.0 Draft Foundation, which is incorporated herein by reference. Further details about Bluetooth are available from the site located at www-.bluetooth.com. Alternatively, the short-range radio link may implement any other secure protocol, or the short-range link may instead use infrared communications instead of radio.

By way of brief background, the Bluetooth standard arose out of cooperation between leaders in the telecommunication and computer industries to make a global standard for wireless connectivity. The standard relies on a low power radio link operating at 2.4 Gigahertz. Bluetooth-provisioned devices must be physically close to each other (i.e., within 100 meters) to communicate. Bluetooth includes a robust authentication mechanism that ensures that a Bluetooth device only communicates with other devices for which it is authenticated, and not with any random device that comes into its range. Briefly, to establish the initial link, a user enters a numerical code (sometimes known as a personal identification number or PIN) in the two devices to establish a Bluetooth link for the first time. The PIN can be any number but must be the same on both devices. Once this is done, the devices communicate with each other using the transceivers to verify that the entered PIN numbers match. If so, one device generates unique key information based on a device address. The unique key is based on the device address and not the PIN to provide additional security. This unique key (generated by one of the devices) then is stored on both devices and used to authenticate the two devices for any subsequent Bluetooth link between them. The Bluetooth standard dictates that the device address for each device must be unique. Therefore, the unique key exchanged on link initialization identifies a unique link and can reliably be used for subsequent authentication when the link is reestablished.

Figure 2:
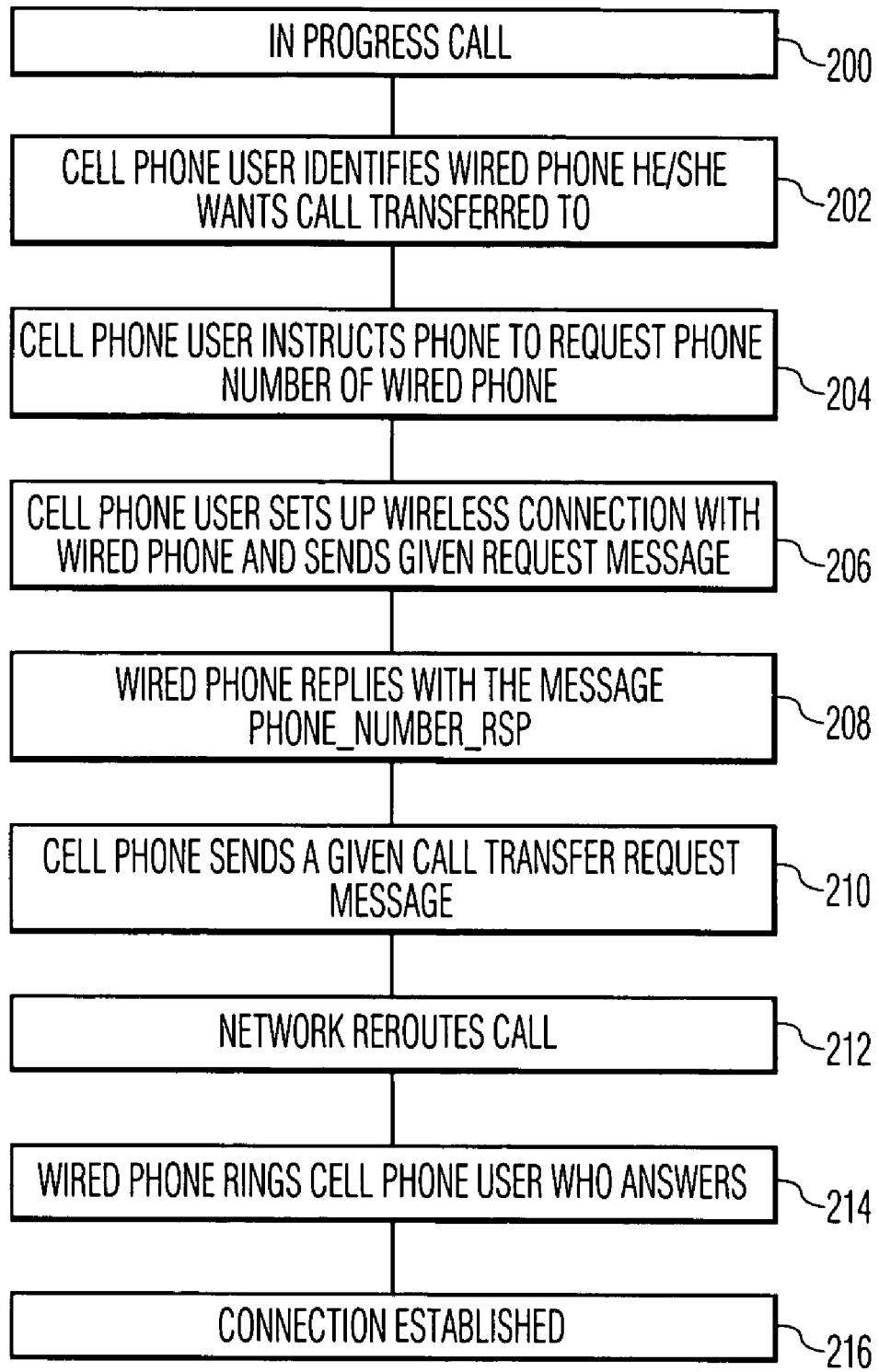
FIG. 2 is a flowchart describing the in-progress call transfer technique.

Returning now back to FIGS. 1 and 2, it is assumed that the wireless telephone 100 is in use. As used, this state is referred to as an "in-progress" call. This is step 200 in the flowchart. At step 202, the user of the wireless telephone 100 identifies the wired telephone 102 that he or she desires the in-progress call to be transferred. The routine then continues at step 204 with the user of the wireless telephone instructing the phone to request the telephone number of the wired telephone. As described above, preferably this request will be made over the short-range wireless communication link 112 that, in the preferred embodiment, implements Bluetooth. Step 204 may be effected by simple user entry of commands via the telephone keypad. If desired, a special "soft" key can be used for this purpose to avoid the parties hearing the normal DTMF keypad tones. A soft key may be located adjacent or within the keypad, with the action associated therewith programmable with software in a known manner.

At step 206, the wireless telephone (using its transceiver 110) sets up a wireless connection with the wired telephone over the short-range wireless communication link 112 and sends a given request message, e.g., PHONE_NUMBER_REQ, requesting the wired telephone's phone number. At step 208, the wired telephone replies over the communication link 112 with a given reply message, e.g., PHONE_NUMBER_RSP, that identifies the wired telephone's number (e.g., +1(212)123-4567). The routine then continues at step 210 with the wireless telephone sending a given call transfer request message, e.g., CALL_TRANSFER_REQ, to the base station 104, passing the wired telephone's phone number with the message. The routine then continues at step 212 with the base station 104 and the cellular network 106 re-routing the in-progress call to the wired telephone's phone number. At step 214, the wireline network 108 establishes a ringing connection to the wired telephone 102, which is then answered, e.g., by the user or another). At this point, the in-progress telephone call is now connected from its source to both the wireless telephone 100 and the wired telephone 102. Thus, at step 216, the user of the wireless telephone goes on-hook to complete the in-progress call transfer.

Thus, according to the present invention, the mobile radio handset includes a transceiver for conventional cellular communications as well as a short-range radio (or infrared transceiver 110) for communicating with a similarly-provisioned wired telephone. These transceivers may be separate devices or integrated within a single circuit package. When the mobile phone's battery is almost exhausted, or for another reason (such as the desire to transfer the call to the wired telephone or to a speakerphone associated therewith), the mobile phone requests the wired telephone's phone number and, in effect, routes the wired telephone's number to the cellular network. The cellular network then transfers the call from the mobile telephone to the wired telephone.

Figure 3:
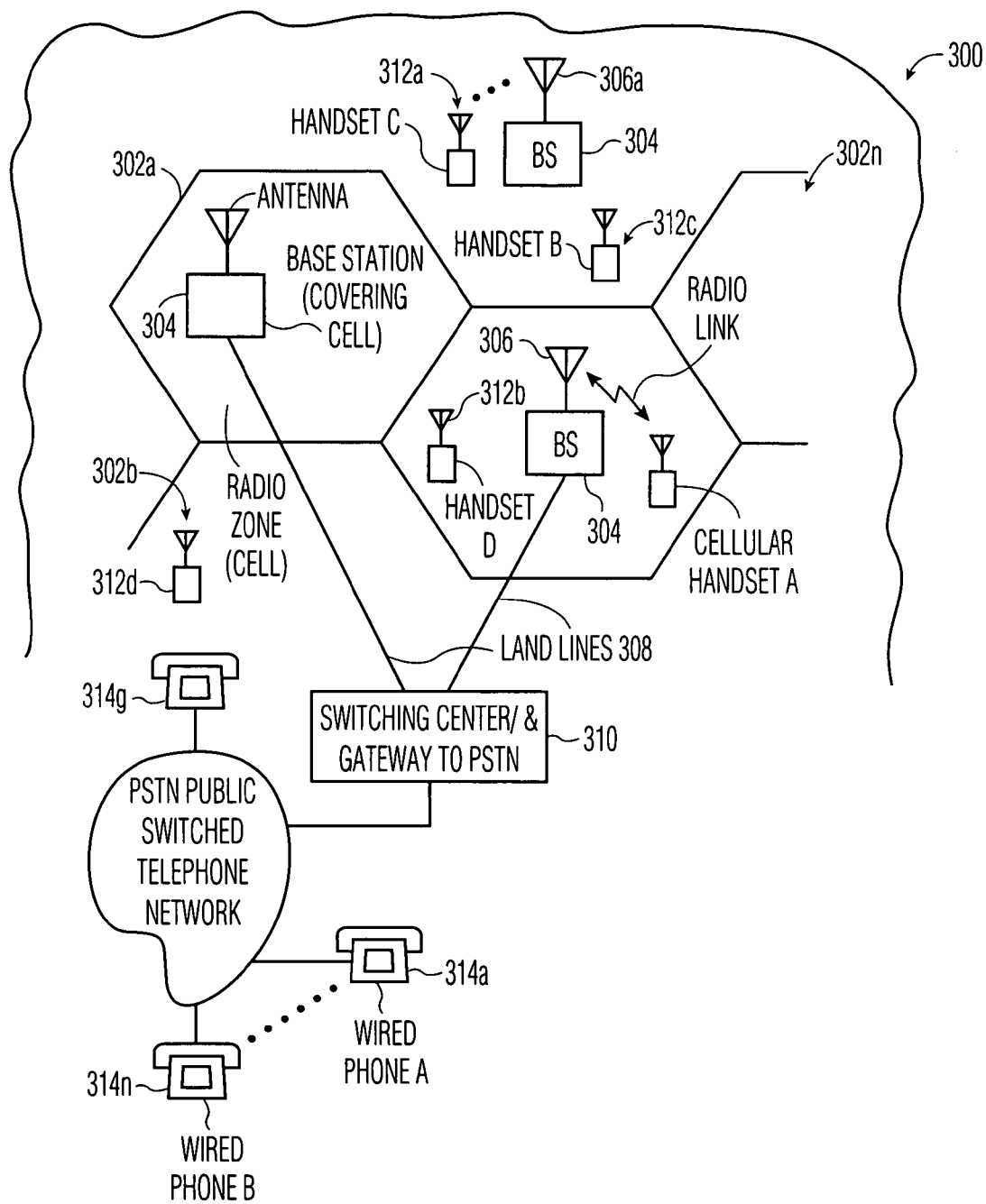
FIG. 3 illustrates the architecture of a conventional cellular radio system in which the present invention may be implemented.

FIG. 3 illustrates the architecture of a conventional cellular radio system in which the present invention may be implemented. Of course, this environment is merely exemplary. In FIG. 3, an arbitrary geographic area 300 may be seen as divided into a plurality of contiguous radio coverage areas or cells 302*a–n*. Any number of cells may be used. A base station 304 is located in and associated with each of the cells. As is well known, each of the base stations 304 includes a plurality of channel units, each comprising a transmitter, a received, and a controller (not shown). The transmitter and the received are sometimes referred to as a cellular transceiver. Typically, each base station is located at the center of its respective cell and is equipped with an omni-directional antenna 306. As illustrated, each of the base stations is connected by voice and data links 308 to a mobile switching center 310 that, in turn, is connected to the Public Switched Telephone Network, or some other similar facility, e.g., an integrated system digital network (ISDN). The links 308 may comprise twisted wire pairs, coaxial cables, fiber optic cables or microwave radio channels operating in either analog or digital mode.

With further reference to FIG. 3, a plurality of mobile radio devices 312*a–n* may be found within the cells 302. As is well-known, each of the mobile radio devices includes a transmitter, a receiver, and controller, and a user interface, e.g., a telephone handset. The transmitter and received are sometimes referred to as a cellular transceiver. Further, one or more wired telephones 314*a–n* are connectable to the PSTN 310 either directly or through known switching architectures, e.g., a central office, a tandem switch, or the like. For purposes of the inventive call-transfer routine, it is assumed that a given wireline telephone (e.g., telephone 312*d*) is in physical proximity to a given wired telephone (e.g., telephone 314*g*) and that each of these devices is provisioned with a short-range wireless transceiver. As described above, these devices may then communicate with each other over the short-range wireless communication link between them to exchange commands and data (namely, the wired telephone's number) as has been described.

Figure 4:
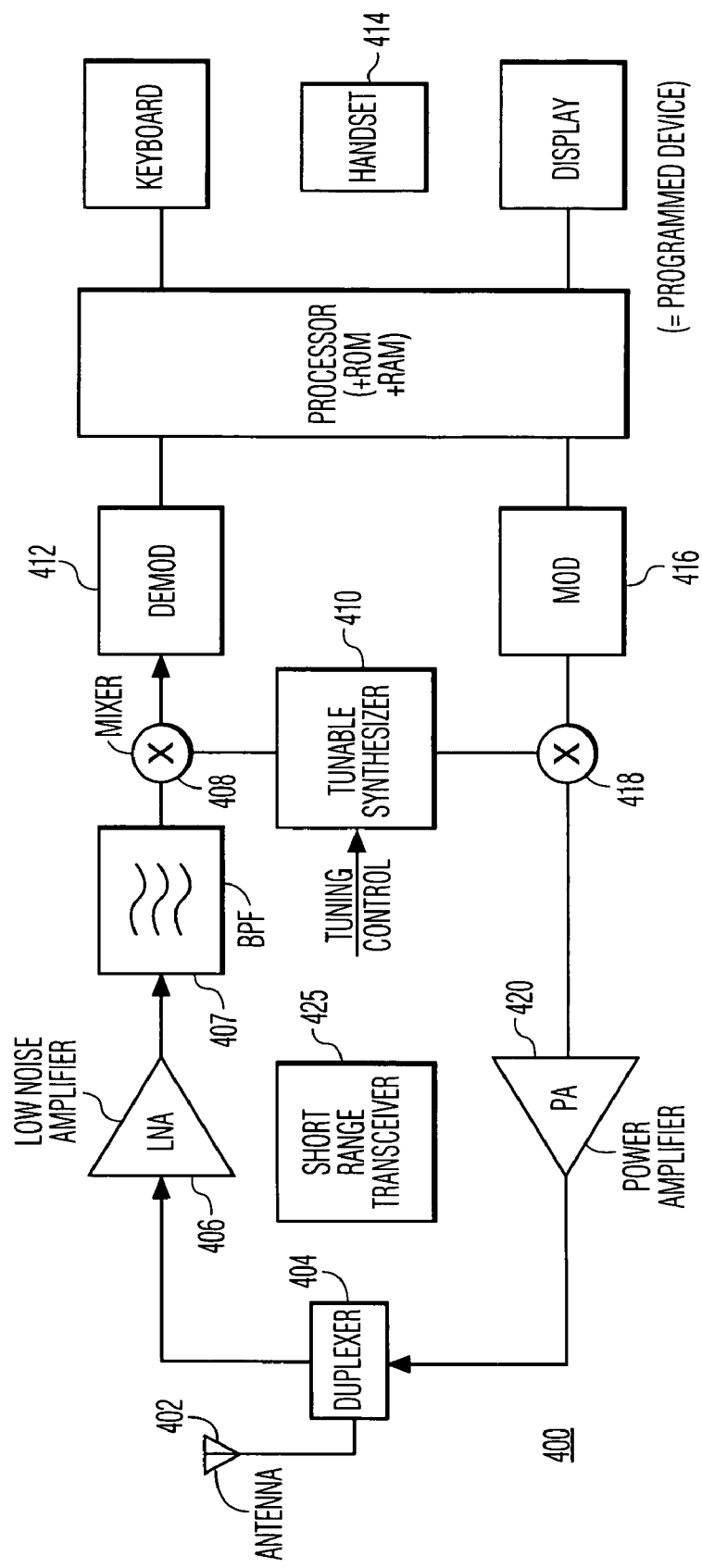
FIG. 4 is a simplified representation of a wireless device that is provisioned to include a short-range wireless transceiver to facilitate the call transfer method of the present invention.

FIG. 4 is a block diagram of an illustrative architecture of a wireless device 400 that may be used in the present invention. The device 400 may be implemented in any convenient form including, without limitation, a mobile telephone, a cellular handset, a personal digital assistant (PDA) or personal computer extended with radio and telephony capability, or the like. The device includes an antenna 402 connected to a duplexer 404. Speech signals received from the cellular network are amplified by a low noise amplifier 406 and then mixed, in mixer 408, with signals output from a tunable synthesizer 410. The output of the mixer 408 is processed through a demodulator 412 to recover the voice signals, which are then passed to a speaker of the headset 414. Speech signals input via a microphone headset 414 are processed by a modulator 416, with the output thereof being mixed, in mixer 418, with signals from the tunable synthesizer 410. The output of the mixer 418 is amplified by power amplifier 420 and then supplied to the duplexer 404 for transmission via antenna 402, in a known manner. The various control circuits are controlled by a software-controlled processor 422 (or other such programmable device), which includes appropriate system memory (RAM) and non-volatile memory (ROM) for storing control programs.

According to the present invention, the wireless device 400 further includes the short-range wireless transceiver 425 for the purposes previously described. Of course, the present invention is not limited to any particular transceiver type or characteristic, except as otherwise described herein.

Figure 5:
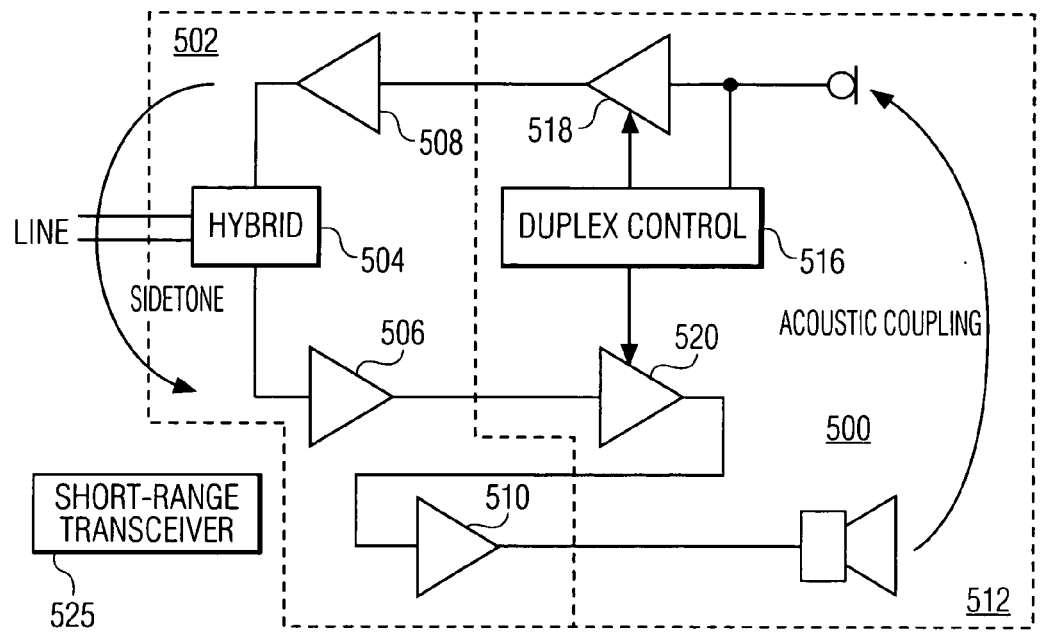
FIG. 5 is a simplified representation of a wired device that is provisioned to include the short-range wireless transceiver to facilitate the inventive call transfer method.

FIG. 5 is a block diagram of an illustrative architecture of a wireline device 500 that may be used in the present invention. The device 500 may be implemented in any convenient form, such as a telephone that offers a handsfree function. Of course, the example device is not meant to limit the present invention, which can be practiced in any type of wired device. The device 500 includes a transmission circuit 502 comprising a hybrid 504, a receiving amplifier 506, a transmit amplifier 508, and a loudspeaker amplifier 510. Device 500 also includes a receiving circuit 512 comprising a microphone amplifier, and a duplex controller 516 with a transmit amplifier 518 and a receiving amplifier 520. The duplex controller 516 monitors the signal and noise on both the transmit and the receive channel to detect which channel contains the largest signal. In one embodiment, the transmission circuit 502 is a Philips Model TEA1096 circuit, and the receiving circuit 512 is a Philips Model TEA1095 circuit. The Model TEA1095 has neither integrated supply nor loudspeaker amplifier, which enables the circuit to be used in applications with external loudspeaker amplifier and external supply, such as cordless telephones and answering machines.

The wired device 500 further includes the short-range wireless transceiver 525 for the purposes previously described. This transceiver is similar to the transceiver 425 that is supported in the wireless device to facilitate the short-range communications protocol.

As noted above, Bluetooth is the preferred communications technique for enabling the devices to transfer commands and data. Bluetooth radio uses a fast acknowledgement and frequency hopping scheme to make the link robust. Devices provisioned under Bluetooth avoid interference from other signals by hopping to a new frequency after transmitting or receiving a packet. Compared with other systems operating in the same frequency band, the Bluetooth radio typically hops faster and uses shorter packets. This makes Bluetooth radio more robust than other systems.

Figure 6:
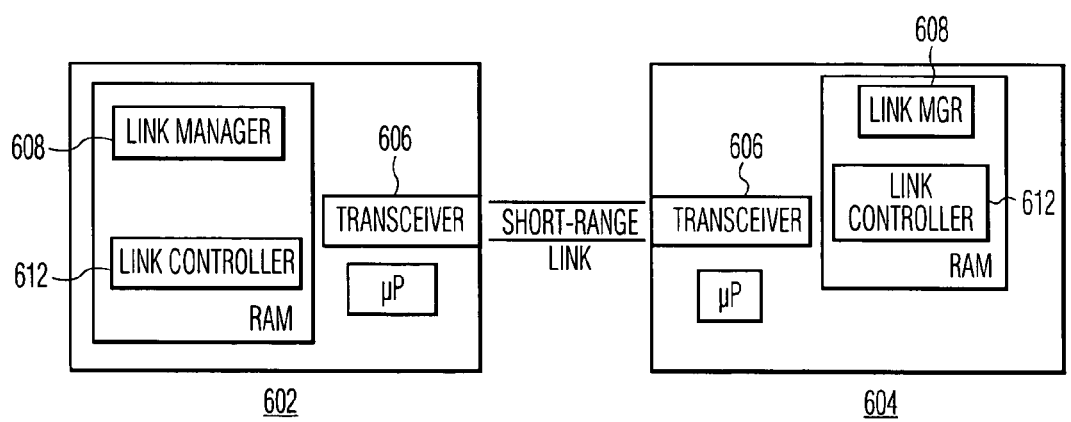
FIG. 6 is a high level block diagram illustrating how the wireless and wired devices are provisioned to facilitate the Bluetooth radio protocol.

FIG. 6 is a simplified block diagram illustrating how a pair of Bluetooth-provisioned devices authenticates each other. As has been described, each of the devices 602 and 604 include a similar transceiver 606. These devices further each include a link manager 608, which is preferably implemented in software that is executed by a processor (uP). The link manager 608 software carries out link setup, authentication, link configuration, and other protocols. It discovers other remote link managers and communicates with them via the Bluetooth Link Manager Protocol (LMP). To perform its service provider role, the link manager 608 uses the services of an underlying link controller 612. These services include, without limitation, sending and receiving of data, name request, link address inquiries, connection set-up, authentication, link model negotiation and set-up (data or data/voice), frame type (on a packet-by-packet basis), and the like.

Having thus described my invention, what I claim is set forth in the following claims.

1. A method of transferring an in-progress telephone call between a wireless device and a wired device, comprising:
   establishing a short-range wireless communication link directly between the wireless device and wired device;
   at the wireless device, receiving an identifier that has been transmitted from the wired device to the wireless device over the direct wireless communication link; and
   at the wireless device, transmitting the identifier together with a call transfer request to enable the telephone call to be transferred to the wired device.

2. The method as described in claim 1 wherein the short-range wireless communication link conforms to a given radio frequency (RF) protocol.

3. The method as described in claim 2 wherein the given RF protocol is Bluetooth.

4. The method as described in claim 1 wherein the short-range wireless communications link is an infrared link.

5. The method as described in claim 1 further comprising:
   at the wireless device, transmitting a request message to the wired device requesting transmission of the identifier.

6. The method as described in claim 1 further comprising:
   in a network, receiving the identifier and the call transfer request transmitted from the wireless device; and
   re-routing the in-progress call to the wired device.

7. The method as described in claim 1 wherein the identifier is a telephone number of the wired device.

8. A method of transferring an in-progress telephone call between a wireless device and a wired device, comprising:
   establishing a first wireless communication link directly between the wireless and wired devices when the devices are in physical proximity to each other;
   at the wireless device, transmitting a request message to the wired device over the first direct wireless communication link requesting transmission of an identifier;
   at the wireless device, receiving the identifier that has been transmitted directly from the wired device to the wireless device over the first direct wireless communication link;
   at the wireless device, transmitting the identifier together with a call transfer request to a network device over a second communication link; and
   at the network device, receiving the identifier together with the call transfer request and re-routing the in-progress call to the wired device.

9. The method as described in claim 8 wherein the first direct wireless communication link is a short-range wireless radio communication link.

10. The method as described in claim 8 wherein the first direct wireless communication link is a short-range wireless infrared communication link.

11. The method as described in claim 8 wherein the identifier is a telephone number of the wired device.

12. The method as described in claim 8 further comprising disconnecting the wireless device from the in-progress telephone call following re-routing.

13. The method as described in claim 8 further comprising:

having a user of the wireless device initiate the establishing of the first direct wireless communication link by entering given control commands in the wireless device.

14. A communication system, comprising:

a wireless device having a first transceiver;

a wireline device having a second transceivers;

a short-range direct wireless communications link over which the wireless and wireline devices communicate using their respective first and second transceivers; and means operative in the wireless device for transferring an in-progress telephone call from the wireless device to the wireline device.

15. The communications system as described in claim 14 wherein the means for transferring comprises:

means for transmitting a request message to the wired device over the direct wireless communications link requesting transmission of an identifier;

means for receiving the identifier transmitted from the wired device to the wireless device over the direct wireless communications link; and means for transmitting the identifier together with a call transfer request to a network device to re-route the in-progress telephone call.

16. The communications system as described in claim 14 wherein each of the transceivers is provisioned according to a given RF protocol.

17. The communications system as described in claim 16 wherein the given RF protocol is Bluetooth.

18. A wireless device, comprising:

a processor, a short-range wireless transceivers;

memory coupled to the processor, tangibly embodying a program of instructions executable by the processor for transferring an in-progress telephone call from the wireless device to a selected wireline device by the following method:

controlling the short-range wireless transceiver to transmit a request message directly to the wired device over a short-range wireless communications link requesting transmission of an identifier;

controlling the short-range wireless transceiver to receive the identifier transmitted from the wired device directly to the wireless device over the short-range wireless communications link; and transmitting the identifier together with a call transfer request to a given network device to request re-routing of the in-progress telephone call.

19. A wireline device, comprising:

a processor;

a short-range wireless transceiver;

memory coupled to the processor, tangibly embodying a program of instructions executable by the processor for receiving a transfer of an in-progress telephone call from the wireless device by the following method steps:

controlling the short-range wireless transceiver to receive a request message transmitted directly from the wireless device over a short-range wireless communications link requesting transmission of an identifier; and controlling the short-range wireless transceiver to transmit the identifier directly to the wireless device over the short-range wireless communications link.

* * * * *